Feb. 10, 1953
L. C. WEATHERS
2,628,334
COMPENSATED FOLLOW-UP SYSTEM
Filed March 14, 1945
7 Sheets-Sheet 2
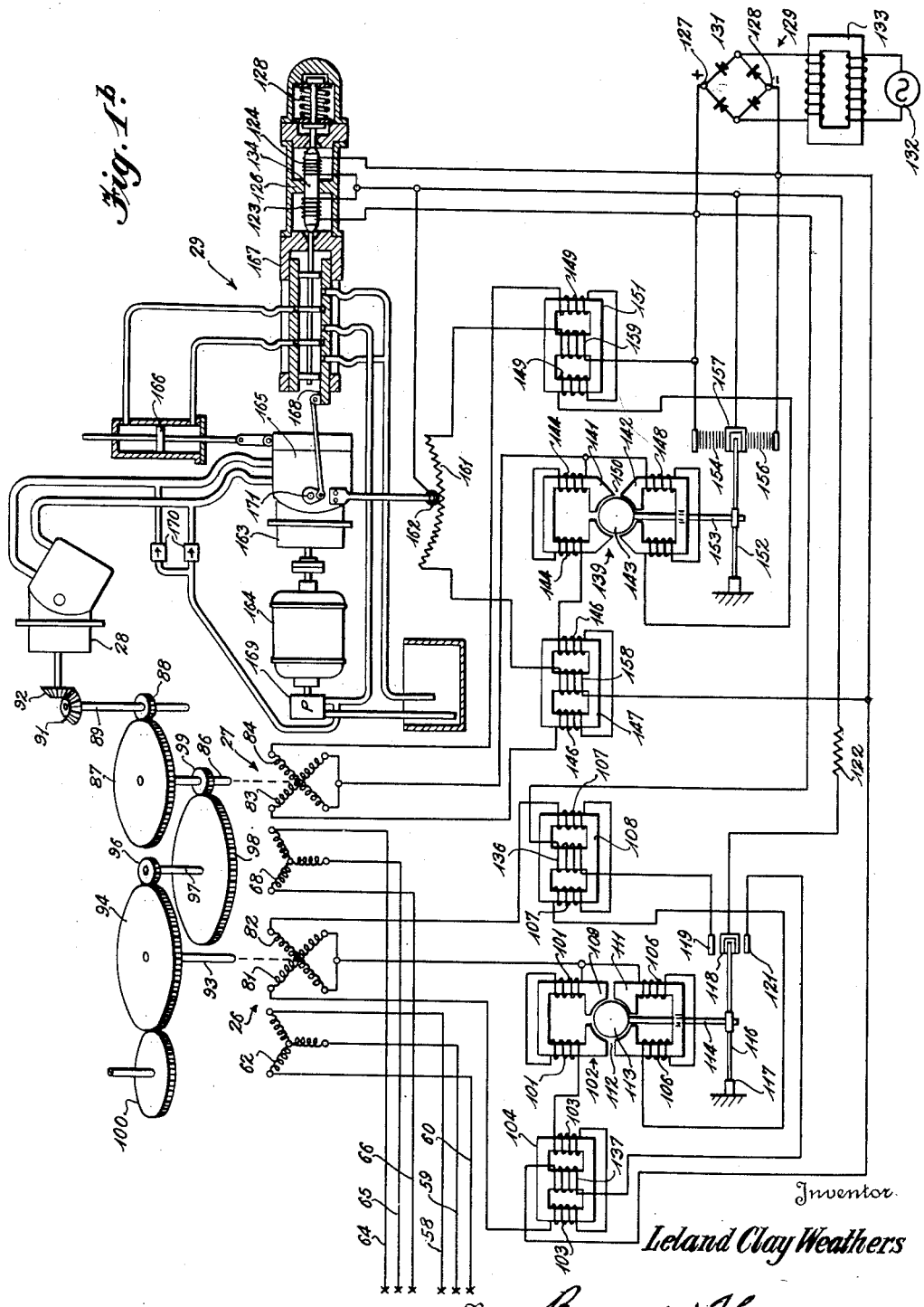
Inventor
*Leland Clay Weathers*
By *Bacon & Thomas*
Attorneys Feb. 10, 1953 — L. C. WEATHERS — 2,628,334
COMPENSATED FOLLOW-UP SYSTEM
Filed March 14, 1945 — 7 Sheets-Sheet 3

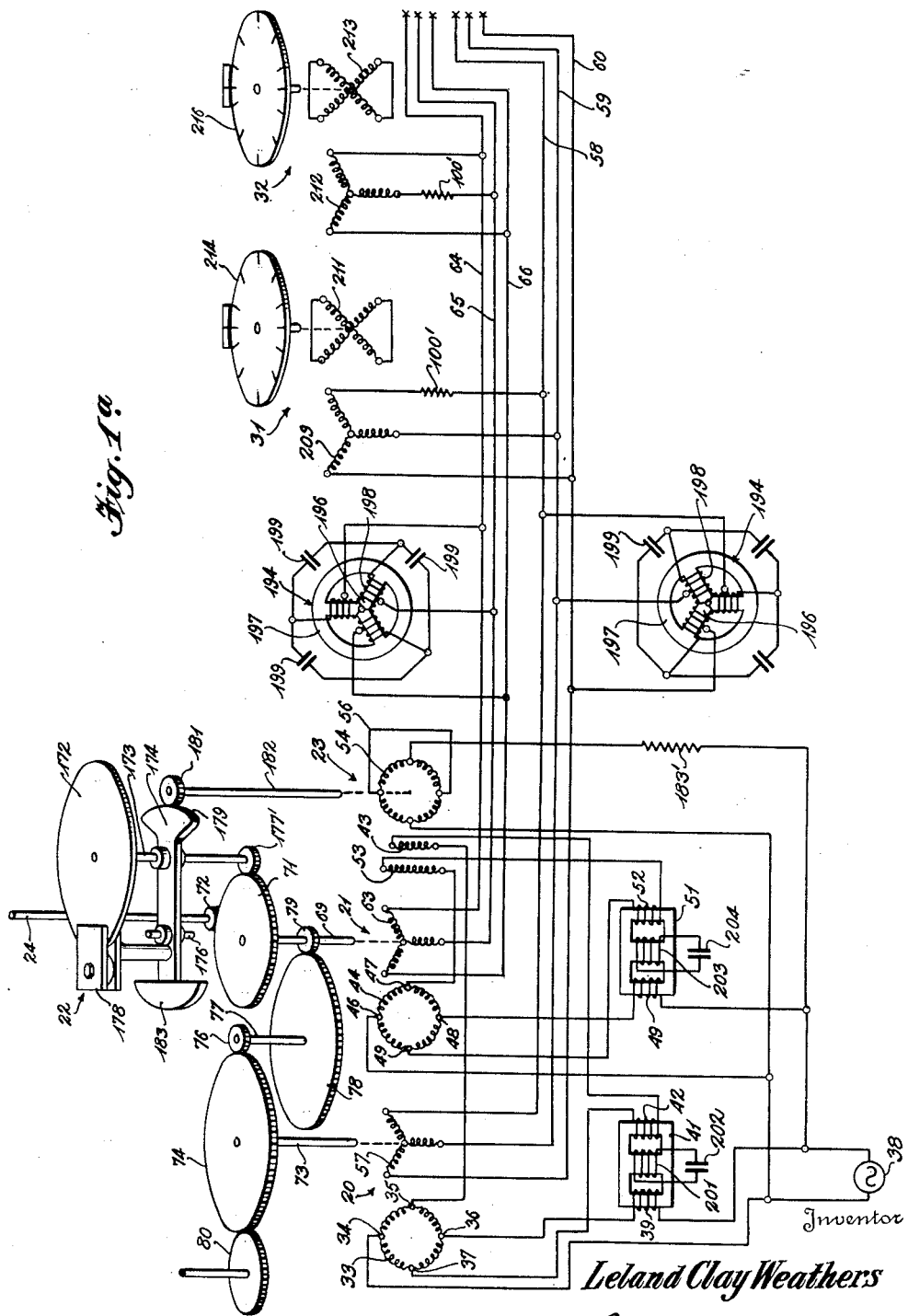

Inventor
*Leland Clay Weathers*
By *Bacon & Thomas*
Attorneys

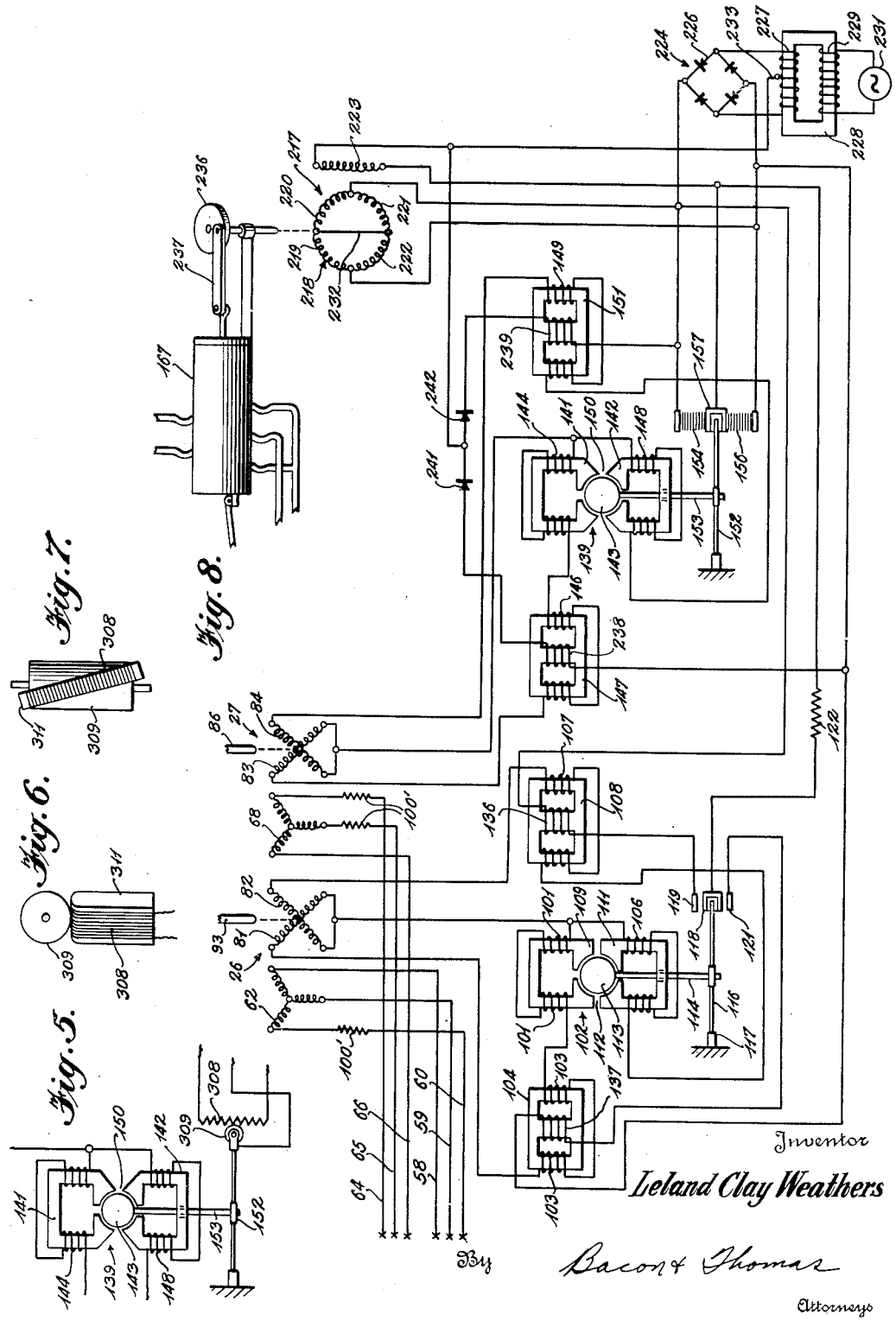

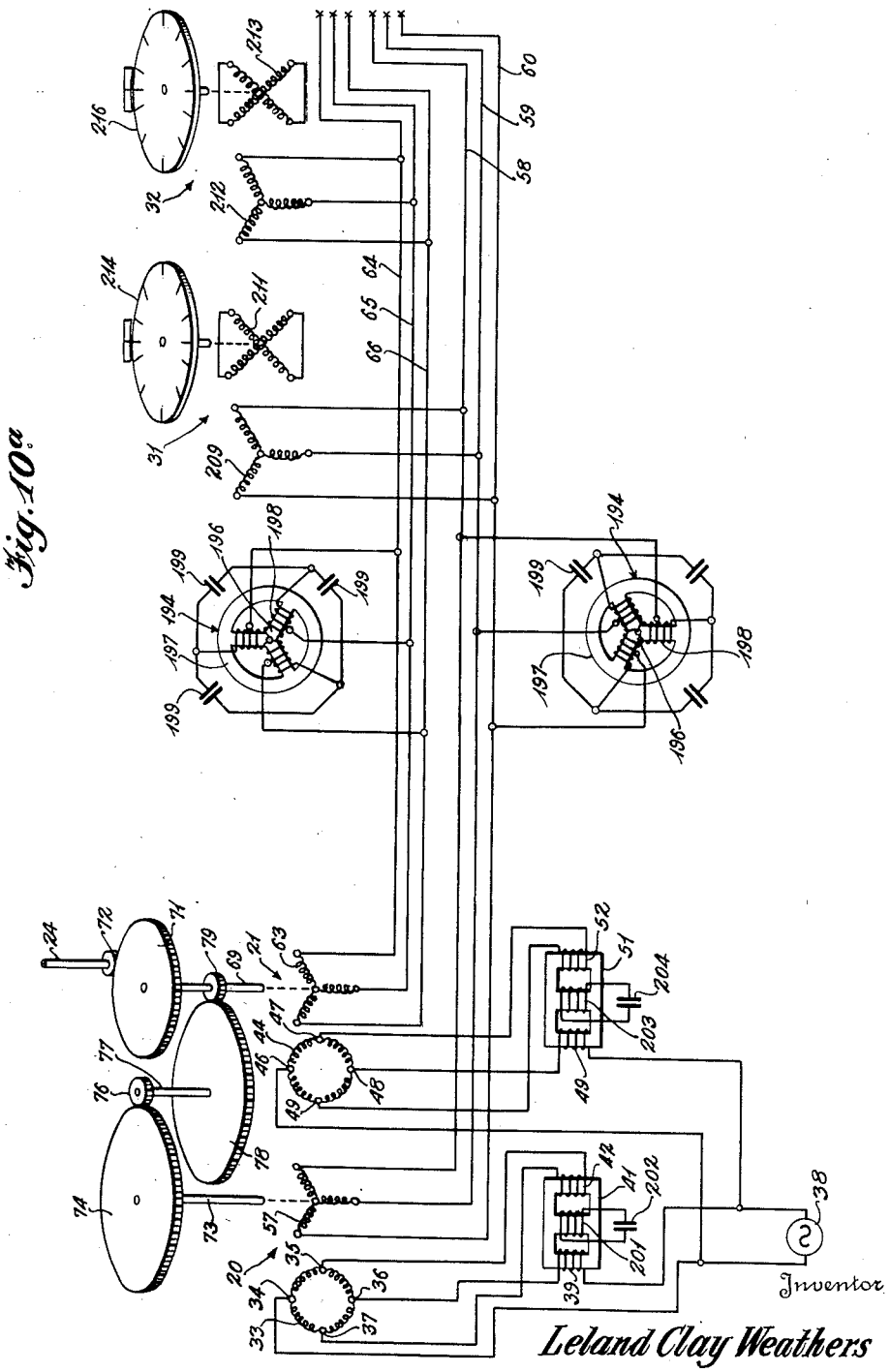

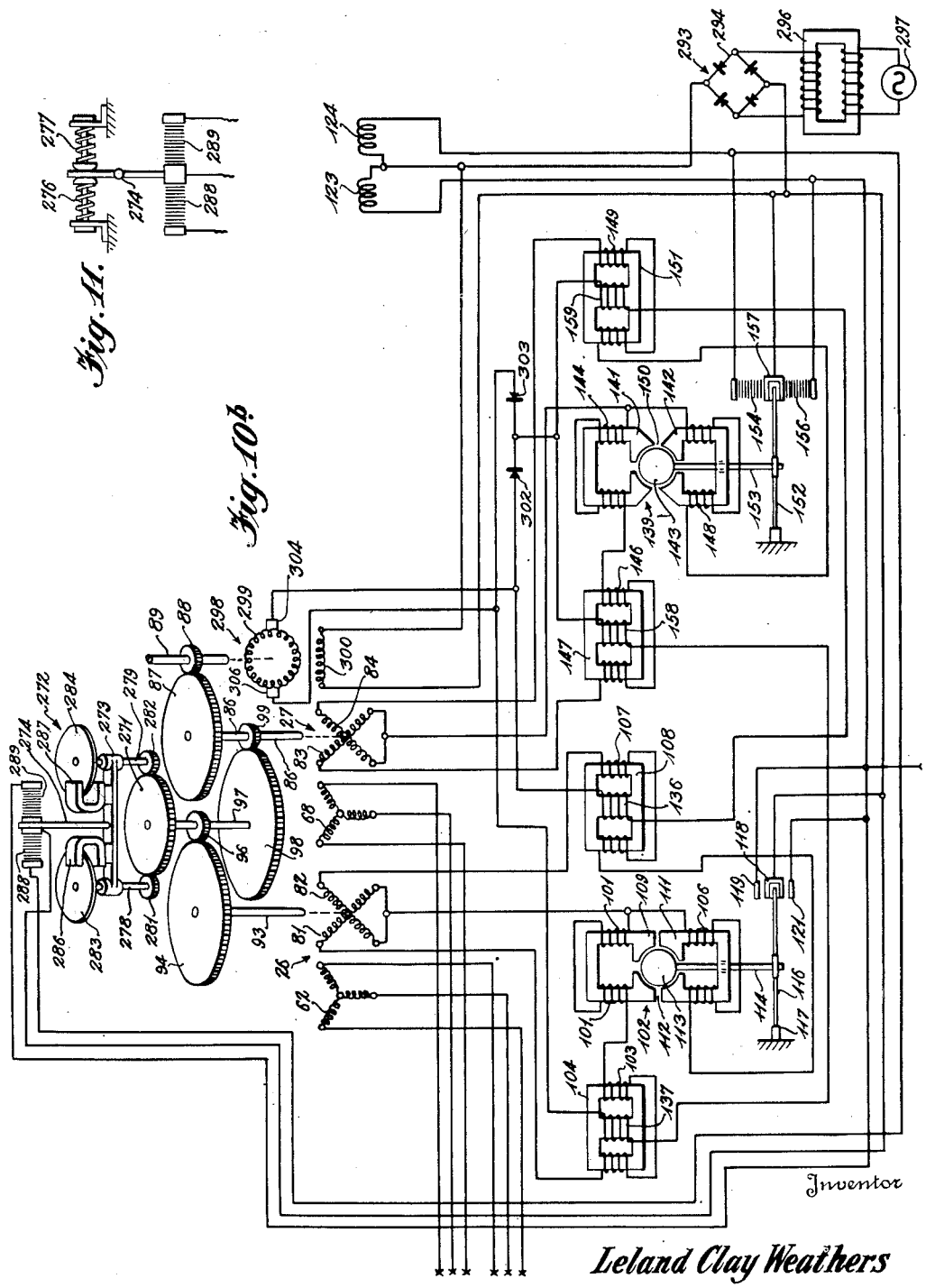

Patented Feb. 10, 1953

2,628,334

UNITED STATES PATENT OFFICE 2,628,334

COMPENSATED FOLLOW-UP SYSTEM

Leland Clay Weathers, Detroit, Mich., assignor to Vickers, Incorporated, Detroit, Mich., a corporation of Michigan Application March 14, 1945, Serial No. 582,716

16 Claims. (Cl. 318—30)

This invention relates to a compensated follow-up system and more particularly to an electrical remote control system for causing a controlled device at a distance from a transmitter to accurately follow the transmitter even though high friction and inertia loads are imposed upon the receiving end of the system and such loads vary widely due to variations in velocity and acceleration of the controlled device.

The system of the present invention is largely concerned with automatically applying both velocity and acceleration compensation in the system so that the power supplied by the prime mover is varied to compensate for variations in the load on the receiving end of the system so as to materially reduce the lag or lead in the system due to such load variations. The acceleration and velocity compensation may be applied either at the transmitter end of the system or the receiving end or partially at both, and involves the employment of devices which are responsive to velocity and acceleration.

The system of the present invention preferably employs receivers which are directly connected to and rotated by the prime mover driving the load at the receiving end of the system and voltages induced in such receivers when an angle of disagreement exists between the receivers and transmitters are employed to control the prime mover. The present system also includes an arrangement for preventing substantial voltage variations in the signal voltage between the transmitters and receivers due to variations in the number of receivers connected to a transmitter.

In follow-up systems in general, it is difficult to provide a system of remotely controlling rapidly varying loads with accuracy. This is caused in part by the fact that it is impossible to make such systems completely "stiff." Dropping speed-load characteristic of electric motors employed to drive the load and leakage in hydraulic systems, if employed, as well as other factors introduce "looseness" into the system. For example, the receiving end of the system tends to overshoot the transmitting end and then oscillate about the point of zero angle of disagreement between the receivers and transmitters if inertia loads are imposed on the system. In the present system the velocity and acceleration compensation referred to above provide an extremely stiff system despite dropping speed-load characteristics of the prime movers and at the same time effectively prevents overshooting and end oscillation of the system.

The present invention also includes novel electrical controls for systems employing a hydraulic prime mover for the load at the receiving end of the system, one embodiment of the invention employing a novel form of torque motor for actuating the hydraulic controls.

It is an object of the present invention to provide a new electrical follow-up system embodying velocity compensation to increase the accuracy of the system.

Another object of the invention is to provide an electrical follow-up system in which compensation is made for increased loads due to acceleration of the load.

Another object of the invention is to provide a follow-up system in which compensation for both increased friction loads due to high velocity and inertia loads due to rapid changes in velocity is effected through a device responsive to both velocity and acceleration.

Another object of the invention is to provide a remote control follow-up system in which compensation for both velocity and acceleration is applied at the transmitting end of the system.

Another object of the invention is to provide a remote control follow-up system in which velocity and acceleration compensation is applied at the receiving end of the system.

Another object of the invention is to provide an electrical remote control follow-up system in which voltages which are functions of acceleration and velocity are produced and employed to modify the control of a prime mover in order to compensate for variations in load on the system due to high velocity and changes in velocities.

Another object of the invention is to provide an improved remote control follow-up system which is capable of controlling loads of large magnitude including both inertia and friction loads while maintaining a small angle of disagreement between the transmitter and receiver and which prevents overshooting or hunting of the system.

A further object of the invention is to provide an improved remote control follow-up system for controlling a hydraulic system driving a load.

Other objects and advantages of the invention will appear in the following description of preferred embodiments thereof shown in the attached drawings of which:

Figure 1a is a schematic drawing of the transmitting portion of an electric follow-up system in accordance with the present invention;

Figure 1b is a schematic drawing of the receiving portion of the system of Figure 1a;

Figure 5 is a fragmentary schematic drawing of a modified control relay useful in the system of the present invention;

Figure 6 is a diagrammatic side elevation of the resistance of the relay of Figure 5;

Figure 7 is a view similar to Figure 6 showing a bottom plan view of the device of Figure 6;

Figure 8 is a view similar to Figure 1b showing a modification of the receiving portion of the system;

Figure 10a is a view similar to Figure 1a showing a modification of the transmitting end of the system;

Figure 10b is a view similar to Figure 1b showing a further modification of the receiving portion of the system; and Figure 11 is a fragmentary diagrammatic view showing in plan the resistor structure of the velocity and acceleration compensating device of Figure 10b.

General description

Figure 2:
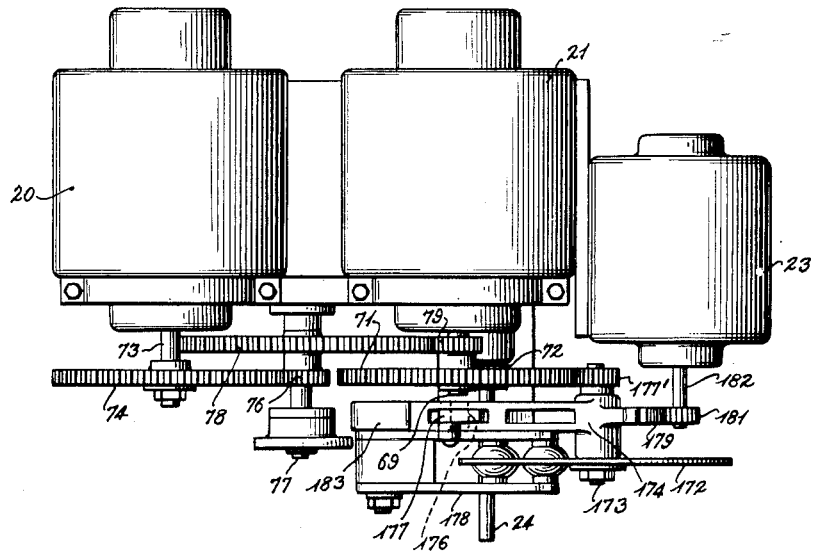
Figure 2 is a plan view of a compensating device for providing both velocity and acceleration compensation.

The system of the present invention as exemplified in Figures 1a and 1b may include a low speed self-synchronous transmitter 20, a high speed self-synchronous transmitter 21, and a velocity and acceleration compensator device shown generally at 22 for driving a compensator transformer 23, the compensator 22 and the transmitters 20 and 21 being driven from a control shaft 24. The complete system may also include a low speed control receiver 26 and a high speed control receiver 27 as shown in Figure 1b. The receivers 26 and 27 are connected so as to be rotated by a prime mover 28 shown as a hydraulic motor forming a part of a hydraulic system indicated generally at 29. A pair of indicating receivers 31 and 32 are also shown in Figure 1a as part of the transmitting portion of the system but such receivers may be positioned in any portion of the system so long as they are connected to the transmitters 20 and 21 respectively. The remaining portions of the system shown in these two figures constitute control circuits and circuits for preventing instability in the system as well as for maintaining a substantially constant differential signal voltage from the transmitters for a given angle of disagreement even though receivers are added to the system or removed from the system. That is to say, a single transmitter can be employed with a plurality of receivers and a change in the number of receivers connected to a transmitter at a given time has very little effect upon the signal voltages.

Transmitters

The transmitters preferably employed in the present invention are of the dually excited or equal impedance type disclosed in my Patent No. 2,227,421. Such transmitters are provided with primary windings excited from a source of alternating current and have a quadrature connection which may be substantially short circuited or be closed through an impedance which is substantially equal to the impedance of the exciting circuit. As shown in Figure 1a the transmitter 20 may have a closed distributed primary winding 33 provided with four equally spaced taps 34, 35, 36 and 37. The primary winding 33 is connected across a source of alternating current 38 through the taps 34 and 36 in series with a winding 39 on a regulator transformer 41. The quadrature connection to the primary winding 33 is connected to the taps 35 and 37 in series with a winding 42 on the regulator transformer 41 and a secondary winding 43 on the stator of the compensator transformer 23. Similarly the primary winding 44 of the high speed transmitter 21 is provided with taps 46, 47, 48 and 49 and is connected across the source 38 through the taps 46 and 48 in series with a winding 49 on a regulator transformer 51. The primary winding 44 is also provided with a quadrature connection through the taps 47 and 49 which quadrature connection contains in series therewith, a winding 52 on the regulator transformer 51 and a secondary winding 53 of the compensator transformer 23. The purpose and operation of the regulator transformers 41 and 51 as well as the purpose and operation of the compensator transformer 23 will be described in detail hereinafter, it being sufficient to note at present that the circuit of the quadrature connection of each of the primary windings of the transmitters 20 and 21 is of substantially the same impedance as the exciting circuit for such primary winding. This is true since the windings 39 and 42 of the regulator transformer 41 associated with the transmitter 20 are of substantially equal impedance and the winding 43 of the compensator transformer 23 is of low impedance. It is to be noted that the primary winding 54 of the compensator transformer 23 is provided with a short circuited quadrature connection 56 and that the winding 43 of this transformer is, at the neutral position of the compensator transformer, positioned with respect to the winding 54 so that the winding 43 is effectively short circuited as to alternating voltages by the quadrature connection 56.

Exactly the same conditions are true as to the circuits connected to the primary winding 44 of the transmitter 21. In other words, the windings 49 and 52 on the regulator transformer 51 are of substantially equal impedance and the winding 53 of the compensator transformer 23 is effectively short circuited in the neutral position of the compensator transformer by the quadrature connection 56.

The low speed transmitter 20 is provided with a phase wound secondary winding 57 which has its phases connected through conductors 58, 59 and 60 with the phases of a phase wound primary winding 62 of the low speed receiver 26 shown in Figure 1b. Similarly the high speed transmitter 21 is provided with a phase wound secondary winding 63 which has its phases connected through conductors 64, 65 and 66 with the respective phases of a phase wound primary winding 68 of the high speed receiver 27. It will be apparent that the excitation of the primary winding 33 of the transmitter 20 from the source 38 will produce a single phase alternating field in the iron of the transmitter, which field is aligned with the taps 35 and 37 of the quadrature connection. This field will induce voltages in the phases of the secondary winding of the transmitter 20 which voltages will vary in the different phases of the winding 57 depending upon the angular position of the stator of the transmitter 20 relative to the rotor.

The rotor of the high speed transmitter 21 may be rotated through a shaft 69 having a gear 71 fast thereon which is in turn rotated from the control shaft 24 through a gear 72 meshing with the gear 71. The rotor of the low speed transmitter 20 may be driven through a shaft 73 having a gear 74 fast thereon and meshing with a gear 76 on a shaft 77 also having a gear 78 thereon which meshes with a gear 79 on the shaft 69 of the rotor of the high speed transmitter. It will be apparent that the low speed transmitter is rotated at a much lower speed than the high speed transmitter. A gear 80 which is of half the diameter of the gear 74 is shown as meshing with the gear 74 solely for illustrating the speed of rotation of the ultimate control element, as hereafter explained, although the actual drive from such control element will ordinarily be supplied through a high speed shaft such as shaft 24.

*Control receivers*

As stated above, the control receivers 26 and 27 are provided with phase wound primary windings 62 and 68 respectively which are connected to the secondary windings 57 and 63 respectively of the transmitters 20 and 21. The phases of the primary windings 62 and 68 of the receivers 26 and 27 are energized by the voltages induced in the corresponding phases of the secondary windings of the transmitters. Currents flow in the primary windings of the receivers to produce single phase alternating fields in the iron of the receivers which vary in angular position with respect to the primary winding of the receivers, depending upon the angular position of the secondary windings of the transmitters with respect to the primary windings thereof. The control receivers 26 and 27 are also provided with angularly disposed secondary windings. Thus the receiver 26 has two secondary windings 81 and 82 arranged at right angles to each other. It will be apparent that voltages will be induced in the windings 81 and 82 by the field in the iron of the receiver 26 caused by currents in the phases of the primary winding 62. The voltages in the windings 81 and 82 will be equal in magnitude for four angular positions of the rotor with respect to the stator. These voltages will be in phase for two of these positions and 180° out of phase for the other two. In other words, there will be two points of synchronism and two points of false synchronism. An exactly similar condition exists as to the high speed receiver 27. That is to say, voltages will be induced in the secondary windings 83 and 84 of the receiver 27 and these voltages will be equal for four different angular positions with the rotor with respect to the stator and will be either in phase or 180° out of phase.

The voltages induced in the windings on the rotors of the receivers are employed to control the prime mover 28 so as to bring the receivers into a position of synchronism. The system is constructed so that the low speed receiver rotates at half the speed of the ultimate controlled shaft so that either position of synchronism of the low speed receiver establishes a definite angular position of the controlled shaft. The same thing is true with respect to the low speed transmitter 20. In other words, the transmitter 20 rotates at half the speed of the ultimate control shaft so that the controlled shaft corresponds in angular position to the control shaft for either position of true synchronism for the low speed receiver 26. The low speed transmitter and receiver operate to maintain the controlled shaft within a few degrees of the angular position of the control shaft and the high speed transmitter and receiver take control only within these few degrees to bring the controlled shaft into precise angular agreement with the control shaft.

It will be noted that the rotor of the high speed receiver 27 is directly connected to the prime mover 28 through a rotor shaft 86 having a gear 87 thereon meshing with a gear 88 on a power shaft 89 driven in any suitable manner, for example, beveled gears 91 and 92 from the prime mover 28. The rotor of the low speed receiver may be driven by a rotor shaft 93 having a gear 94 thereon meshing with a gear 96 on a shaft 97 also having a gear 98 meshing with a gear 99 on the rotor shaft 86 of the high speed receiver 27. The gear ratio between the rotor shafts 73 and 69 of the low speed and high speed transmitters respectively is the same as the gear ratio between the shafts 93 and 86 of the low speed and high speed receivers respectively. A gear 100 having half the diameter of gear 94 is shown as meshing with gear 94 solely to illustrate the speed relation of the ultimate controlled shaft, although the drive to such shaft will ordinarily be from the shaft 89 through a separate system of power gearing.

Even though extreme care is taken in constructing all portions of the transmitter and receiver system including these elements themselves, the connections therebetween and any other devices associated therewith to provide perfect symmetry as far as possible, some phase unbalance will usually be found to exist so that the receivers do not accurately follow the transmitters in all angular positions thereof. It has been found that this condition can be completely corrected by inserting small resistors 100' in one or more of the conductors between the receivers and transmitters. It is more convenient to treat each receiver individually so that these resistors are placed in the individual receiver primary leads. The correct values can easily be determined by connecting variable resistors in the leads to adjust the receivers so that phase unbalance is corrected and then substitute fixed resistors. While such resistors are shown only in the receiver leads, it is entirely possible to correct for phase unbalance caused by any device connected to the signal circuit by inserting proper resistors in its leads from the signal circuit.

*Low speed receiver control system*

As stated above voltages induced in the secondary windings of the receivers 26 and 27 are employed to control the prime mover 28 to bring the receivers 26 and 27 into synchronism, i. e., zero angle of disagreement, with the transmitters 20 and 21 respectively. The rotor winding 81 of the low speed receiver 26 is connected in series with a winding 101 on a low speed differential control relay 102 and a winding 103 on a saturable reactor 104. Similarly the winding 82 on the receiver 26 is connected in series with a winding 106 on the relay 102 and a winding 107 on a saturable reactor 108. The purpose of the saturable reactors 104 and 108 will be described in detail below but for the present it is apparent that when the voltages in the windings 81 and 82 of the low speed receiver 26 are equal and the reactors 104 and 108 provide equal impedances, the windings 101 and 106 on the relay 102 will be energized to an equal extent. The low speed relay 102 includes U-shaped core members 109 and 111 upon which are wound the windings 101 and 106 respectively. The core members 109 and 111 provide a central circular shaped aperture 112 for loosely receiving a round armature 113. The armature 113 is connected by a member 114 to a spring contact carrying member 116 having one end fixedly secured at 117 and the other end provided with a central contact 118 insulated from the member 116. The spring member 116 maintains the armature 113 in a central position

control relay 139 having core members 141 and 142 and a central circular armature 143. The core member 141 is provided with a winding 144 connected in series with the winding 83 of the receiver 27 through a winding 146 on a saturable reactor 147. The core member 142 is provided with a winding 148 connected in series with the winding 84 of the receiver 27 through a winding 149 on a saturable reactor 151. Contrary to the connection of the windings on relay 102, the control windings 144 and 148 on relay 139 are connected so that under conditions of zero angle of disagreement between the receiver 27 and the transmitter 21 the flux in the core members 141 and 142 tends to remain in the respective core members and not cross the air gaps between the core members. The core members of the high speed relay 139 also preferably have their adjacent portions cut away as shown at 150 so that the core members have very little shunting effect on each other. Under these conditions the armature has a strong tendency to remain at one extreme position or the other even when the relay windings 144 and 148 are equally energized. The spring member 152 connected to the armature 143 through the member 153, however, has sufficient spring force to maintain the armature 143 close to its central position. As the windings 144 and 148 are energized with alternating current, the result is that the armature 143 constantly vibrates so that the action of the high speed control system is impulsive. That is to say, the entire system constantly vibrates with small amplitude when under control of the high speed receiver so that the effect of static friction is largely eliminated.

Instead of contacts, the armature 143 of the high speed control relay preferably actuates a variable resistance device shown in Figure 1b as made up of two carbon piles 154 and 156 having a central movable member 157 insulated from but actuated by the spring member 152. The carbon pile 154 is connected in parallel with the contacts and the winding 123 of control solenoid 126 and similarly, the carbon pile 156 is connected in parallel with the winding 124 of the control solenoid 126. Thus when there is no engagement between contact 118 and either contact 119 and 121, the carbon piles 154 and 156 control the energization of the operating windings 123 and 124 of the control solenoid 126. The carbon piles 154 and 156 will, however, always present substantial resistance to flow of current therethrough so that the effect of engagement of contact 118 with either contact 119 and 121 is much greater than the effect of the carbon piles 154 and 156. This means, that at a predetermined angle of disagreement of the low speed receiver with respect to its transformer, the low speed receiver is in complete control and the high speed receiver is only effective when the low speed receiver relinquishes control. When the armature 143 of the high speed control relay 139 is in its central position, the carbon piles 154 and 156 have equal resistance so that the windings 123 and 124 are equally energized. Movement of the armature 143 in an upward direction decreases the resistance of carbon pile 154 and increases the resistance of carbon pile 156 to shunt a greater amount of current from the coil 123 and decrease the shunting of current from coil 124. This results in a greater energization of coil 124 than coil 123 to cause the solenoid plunger 134 to move to the right to an extent depending upon the difference in energization of the windings 123 and 124. Conversely downward movement of armature 143 increases the energization of coil 123 and decreases the energization of coil 124 to cause the solenoid plunger to move to the left.

The circuit for the saturating windings 158 and 159 of the saturable reactors 147 and 151 respectively includes a variable resistor 161 or retardation rheostat, the purpose of which will be more fully described below. Thus a circuit through these windings can be traced from the terminal 127 of the direct current source 129 through winding 159 on reactor 151, then through resistor 161 and winding 158 on reactor 147 back to the other terminal 128 of the direct current source. A roller 162 making contact with the resistor 161 is electrically connected to the inner ends of the control solenoid windings 123 and 124 and also to the central member 157 of the carbon piles 154 and 156. The winding 158 on the saturable reactor 147 and the left portion of the resistor 161 are thus connected in parallel with the control solenoid winding 124 and the winding 159 on the saturable reactor 151 and the right portion of the resistor 161 are connected in parallel with the control solenoid winding 123. So long as the roller 162 is maintained in a central position on the resistor 161, very little current flows through the saturating windings 158 and 159 on the reactors 147 and 151 respectively as the resistor 161 has sufficiently high resistance to keep this current at a small value. As hereafter described, the position of roller 162 on resistor 161 depends upon the velocity and direction of rotation of the prime mover 28 and the retardation rheostat comprising the resistor 161 and contact 162 constitutes a stabilizing means to prevent too rapid movement of control solenoid plunger 134 toward its central position when the system has been traveling at high velocity and the control signal suddenly decreases.

Hydraulic driving system

While any type of variable speed prime mover can be controlled by the system of the present invention, hydraulic systems have reached a high stage of perfection, providing accurate speed control of driven members. There are several different types of hydraulic systems which can be employed but the majority of them include a variable volume or variable stroke pump 163 driven in any suitable manner, for example, by electric motor 164. The pump 163 drives hydraulic motor 28 which is the prime mover for the controlled member and is ordinarily of the constant stroke type. Both the pump 163 and the motor 28 may, for example, be of the type disclosed in the patent to Thoma 1,931,969, the motor 28 having a fixed yoke while the pump 163 has an oscillatable yoke 165 movable by the piston of a hydraulic cylinder 166. As disclosed in said patent to Thoma angular movement of the yoke 165 of the pump 163 about its pivot 171 varies the direction of pumping and the stroke of the pump, the stroke increasing from zero as the yoke is moved from its central position shown in Figure 1b. Fluid under pressure may be supplied to the cylinder 166 from a four way balanced hydraulic control valve diagrammatically shown at 167 having its valve member connected to and movable by the solenoid plunger 134 and provided with a follow-up sleeve 168 actuated by movement of the yoke 165 of the pump 163. A small constant pressure pump 169 may be driven by the motor 164 to supply fluid under pressure to the valve 167 and make up fluid to the main hydraulic system through check valves 170. The hydraulic motor 28 is driven at a speed dependent upon the position of the solenoid plunger 134 as this controls the position of pump yoke 165. As the plunger 134 is moved to the right in Fig. 15 the motor 128 is driven in one direction at a speed dependent upon the position of said plunger and similarly if the plunger 134 is moved to the left, the motor 28 is driven in the opposite direction at a speed dependent upon the position of the plunger 134. The roller 162 of the retardation rheostat is mechanically connected to the pump yoke 165. Since the position of the yoke 165 of the pump is determined by the speed and direction of the motor 28, the position of the roller 162 on the resistor 161 is a direct function of the velocity of the driven or controlled member.

Compensator

Figure 3:
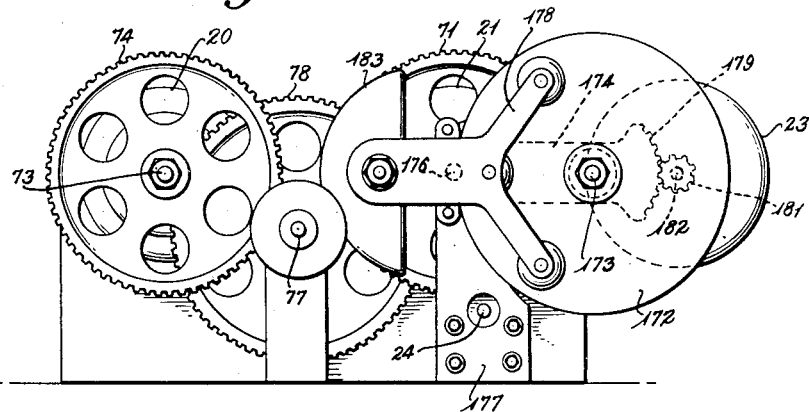
Figure 3 is a side elevation of the device in Figure 2.

The compensator 22 shown diagrammatically in Figure 1a and in greater detail in Figures 2 and 3 may include a disc 172 of electrically conducting material carried by a shaft 173 journaled in a pivoted member 174 which in turn is pivotally mounted on a shaft 176 positioned in a standard 177 shown in Figures 2 and 3. The shaft 173 for the disc 172 carries a small gear 177' meshing with the gear 71 on the rotor shaft 69 of the high speed receiver. The shaft 176 for the pivoted member 174 is mounted concentric with the shaft 69 so that the pivoted member 174 may oscillate about the center of shaft 176 while retaining the gear 177' in meshing relationship with the gear 71. The pivoted member carries a magnet 178 which has its poles positioned on opposite sides of the disc member 172 so as to constitute a magnetic drag for the disc. The pivoted member 174 is provided at one end with a segmental gear 179 which meshes with a gear 181 on the rotor shaft 182 of the compensator transformer 23. The pivoted member may be provided with a counterweight 183 for the disc 172 and associated gearing as well as for the segmental gear 179 so that the compensator may be mounted in any position, for example, the horizontal position shown in Figure 3.

It will be apparent that when the shaft of the high speed receiver 21 is being rotated, it will drive the disc 172 through the gears 71 and 177'. Since the magnet 178 exerts a magnetic drag on the disc 172, the pivoted member 174 tends to be carried around by the gear 71 acting through the gear 177' and the shaft 173. The force tending to move the pivoted member 174 will be a direct function of the speed of rotation of the disc 172, that is a direct function of the speed of rotation of the control member. This force tends to rotate the rotor shaft 182 of the compensator transformer 23 through the segmental gear 179 and the gear 181. The compensator transformer resists such rotation as hereafter described but for any constant speed of the control shaft 24, the rotor of the compensator transformer 23 is rotated to an angle which is substantially proportional to the speed of the control shaft and the direction of which depends upon the direction of rotation of the shaft 24. This action of the compensator provides for velocity compensation, i. e., changes in friction loads due to changes in velocity, as also hereafter explained.

The compensator 22 also provides acceleration compensation to compensate for varied loads due to inertia of the controlled members. The disc 172 in addition to being made of electrically conductive material also has a relatively large moment of inertia. This means that the disc 172 resists sudden changes in its speed of rotation so that a sudden increase in the speed of the shaft 69 and gear 71 causes the pivoted member 174 to move further in direction of the rotation of the gear 71. Conversely a sudden slowing down of the gear 71 will cause the pivoted member 174 to move in a direction opposite to the direction of the rotation of the gear 71. Thus a change in speed of rotation of the gear 71 introduces an acceleration compensation which may add to or subtract from the velocity compensation described above. The compensator above described is essentially a mechanical differential having an input shaft constituting the control shaft 24, an output shaft constituting the compensator shaft 182 and an intermediate shaft having a weighted disc thereon also subjected to a drag such as a magnetic drag which is proportioned to the speed of rotation of the intermediate shaft.

Compensator transformer

The compensator transformer 23 is employed to introduce voltages into the primary windings of the transmitters 20 and 21 which have the effect of rotating the fields in the iron of the transmitters. The primary winding 54 of the compensator transformer is preferably a closed winding excited in one axis from the alternating current source 88. This excitation produces a single phase alternating field in the iron of the compensated transformer which cuts the conductors of the compensating windings 43 and 53 which are connected to the primary windings 33 and 44 respectively of the transmitters. As long as this field is in quadrature to the windings 43 and 53, i. e., the compensator is in neutral position, no resultant voltages are induced in these windings. If the rotor of the compensating transformer is rotated so as to occupy a position at an angle from this neutral position resultant voltages are induced in the windings 43 and 53 and these voltages are introduced in the quadrature axis of the windings 33 and 44 respectively of the transmitters. Quadrature currents then flow into windings 33 and 44 to produce fields at right angles to the main fields in the iron of the transmitters 20 and 21 which have a magnitude substantially proportional to the angular displacement of the rotor of the compensating transformer 23 from its neutral position. The effect is to rotate the fields in the transmitters 20 and 21 to a degree which is substantially proportional to the velocity of the high speed transmitter 21 or the acceleration thereof or both. By correctly connecting the windings 43 and 53 of the compensating transformer to the windings 33 and 44 respectively of the transmitters, the rotation of the fields in the transmitters 20 and 21 gives the same effect as an additional rotation of the rotors of the transmitters themselves. That is to say, a given speed of rotation of the shaft 69 of the high speed transmitter produces the effect of a lead of both transmitters. The same thing is true of an acceleration in a given direction whereas a deceleration produces the effect of a lag of the transmitters. This lead or lag is transmitted to the receivers 26 and 27 so that the controlled mechanism associated therewith applies increased power to the controlled member proportional to the speed of rotation of the system and to a positive acceleration of the system whereas a negative acceleration decreases the power applied to the controlled member.

Because of leakage reactance the secondary voltage of the compensator transformer tends to be slightly out of phase with the primary voltage;

but the secondary voltage of the compensator transformer should be exactly in phase with the excitation voltage of the transmitters which is the same as the primary voltage of the compensator transformer. By inserting a resistor 183' in the primary circuit of the correct value, the secondary voltage of the compensator transformer can be brought into phase with the excitation voltage for the transmitters.

Figure 4:
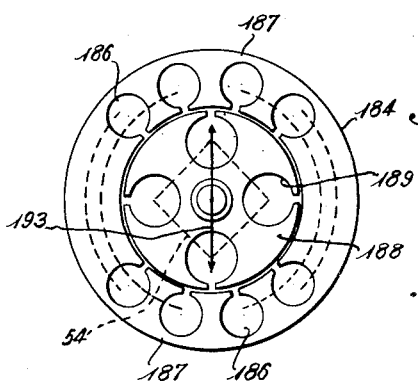
Figure 4 is an end elevation of the iron structure of a compensating transformer showing the position of coils thereon in dotted lines.

There are two factors tending to return the rotor of the compensator transformer to its neutral position in which no voltages are induced in the windings 43 and 53. One of these is the motor action caused by currents flowing in the windings 43 and 53 by reason of the closure of these windings through the windings 33 and 44 respectively of the transmitters. The other is a result of the iron structure of the compensator transformer, this iron structure is shown diagrammatically in Figure 4 and includes a stator structure 184 having a plurality of substantially closed slots 186 in opposite portions thereof, the slots approaching quite close to the periphery of the stator structure to provide relatively thin iron sections at 187. The rotor structure 188 preferably has four equally spaced substantially closed slots. The four coils of the closed rotor winding 54 are indicated by the dotted lines connecting the slots 189. The position of the stator windings 43 and 53 are shown by the dotted lines connecting the stator slots 186. Preferably both windings 43 and 53 are positioned in all of the slots of the stator but the winding 43 for the low speed transmitter will ordinarily have a lesser number of turns than winding 53 since the angle of disagreement is always greater when the low speed transmitter is in control than is the case when the high speed transmitter is in control.

When the primary windings 54 are excited as shown in Figure 1a, a single phase alternating field is set up in the iron of the compensating transformer and the rotor seeks a position of minimum reluctance for the magnetic field. This position of minimum reluctance of the field is indicated by double ended arrow 193 (Fig. 4), as in this position the majority of the flux has to traverse only two of the thin sections 187 in its complete circuit whereas in a position at right angles to the arrow 193 the flux must necessarily traverse at least four of the thin sections 187 in its complete circuit. The result is that there is a restoring force resisting rotation of the rotor from its neutral position shown in Figures 4 and 1a and no springs are required for returning the compensating transformer to its neutral position when the force imparted thereto from the compensator decreases to zero.

*Exciting transformers*

The system thus far described is completely operable to produce accurate follow-up action. The three wire receivers 26 and 27, however, constitute an inductive load on the transmitters 20 and 21 respectively at all times. That is to say, the transmitters must furnish excitation current for the receivers resulting in a very low power factor in the system. This is desirably overcome by employing static condensers to furnish at least a portion of the exciting current. Since the voltages across the conductors between the transmitters and receivers are relatively low, extremely large capacity condensers would have to be employed if the condensers were directly connected to such conductors. It is, therefore, desirable to employ step-up transformers but care must be taken to prevent phase unbalance due to differences in impedance in the windings of such transformers. For this purpose a balanced three phase transformer has been developed, one of which 194 is shown connected to the conductors 64, 65 and 66, between the high speed transmitter 21 and receiver 27. Transformer 194 has a laminated Y-shaped inner core member 196 having three equal legs extending at angles of 120° to each other. This inner core member 196 is surrounded by a laminated ring-shaped magnetic member 197. The phase windings 198 are shown as being positioned on the individual legs of the inner core 196 and are further shown as constituting Y-connected auto transformer windings. Condensers 199 are shown as being connected across the high voltage terminals of the auto transformer windings. If the condensers 199 all have the same capacity and the windings 198 are similar, phase unbalance due to unequal magnetic circuits in the transformer is substantially eliminated and can be further corrected by resistors in the leads, if necessary. An exactly similar transformer 194 and associated circuit can be connected to the conductors 58, 59 and 60 connecting the low speed transmitter 20 and receiver 26 and the elements of this transformer and associated circuit have been given the same reference numerals. With this arrangement the condensers 199 can have relatively small capacity if they are capable of withstanding high voltages. A desirable adjustment of the system is to provide condensers 199 of sufficient capacity to furnish half of the exciting current for the system under average load conditions, the remainder of the exciting current being furnished from the source 38.

*Regulator transformers*

One of the advantages of the present system is that a large number of receivers can be controlled from a single transmitter and that the number of receivers connected to a given transmitter can be varied during operation of the system without disturbing the accurateness of the follow-up action. In the system thus far described, however, adding additional receivers will decrease the control voltage from a transmitter and removing receivers will increase the control voltage. The regulator transformers 41 and 51 shown in Figure 1a can be employed in conjunction with the static condenser circuits just described to maintain a substantially constant signal voltage in the system as receivers are connected or disconnected from a transmitter. Transformer 41 has, in addition to the windings 39 and 42 in the direct and quadrature circuits respectively of the transmitter primary windings 33, a third winding 201 on a central leg of the core. The winding 201 is preferably of a greater number of turns than the windings 39 and 42 so that the transformer 41 constitutes a step up transformer. High voltage condenser 202 is connected across the terminals of the winding 201 and since this winding is symmetrically disposed with respect to windings 39 and 42 it does not disturb the substantially equal impedance relation of the circuits including the latter mentioned windings.

The voltage drop across the primary winding 39 of the transformer 41 will lead the current by approximately ninety degrees, there being a small in-phase component to supply the losses. At no load, i. e., no receivers connected to the transmitter 20, the transmitter circuit will be drawing a leading current from the source 38 because of the exciting condensers 199 in the secondary circuit of the transmitter. Thus, the voltage drop in the primary winding 39 of the regulator transformer will be practically in phase opposition to the line voltage and the voltage to the transmitters will be reduced. As load is applied, that is, as more receivers are connected to the transmitter, a condition will eventually be reached where the current to the transmitters is in phase with the voltage. The current will then have its minimum value; the voltage drop across the regulators will also be a minimum. As more load is applied, the current to the transmitter will lag the voltage, and the voltage drop across the regulator is in such a direction as to add to the line voltage. Thus, the secondary or signal voltage of the transmitter will remain practically constant regardless of load. The core of the regulator transformer is designed so it will be just saturated at full load. Then, if the transmitter should become overloaded, the voltage across the condenser 202, connected to the secondary of the regulator transformer, will not become excessive. The regulator transformer 51 for the high speed transmitter is also provided with a secondary winding 203 and condenser 204 and operates in conjunction with the condensers 199 in the secondary of the transmitter 21 in exactly the same manner as the transformer 41 to maintain the signal voltage in the secondary of the transmitter 21 substantially constant irrespective of the load on the transmitter.

*Indicating receivers*

The indicating receivers 31 and 32 are preferably of the general type also shown in my Patent No. 2,227,471. Thus the indicating receiver 31 is provided with a phase wound primary winding 209 connected to the phase wound winding 57 of the transmitter 20 and a short circuited secondary winding 211 having two coils positioned at right angles to each other and having their end terminals interconnected. The indicating receiver 32 is entirely similar to the indicating receiver 31 and has its phase wound primary winding 212 connected to the phase wound winding 63 of the high speed transmitter 21 and a short circuited secondary winding 213 entirely similar to the winding 211 of the indicating receiver 31. These indicating receivers have two points of synchronism as is the case with the power receivers 26 and 27. By graduating the dials 214 and 216 of the indicating receivers so that each half of the dial has a scale from zero to 360°, the indicating receivers indicate the correct angular position of the ultimate control member or controlled member.

Such indicator receivers can be employed at any place in the system so long as they are connected to transmitters in the same manner shown in Figure 1a. Such receivers also constitute an inductive load on the transmitters as all of the exciting current therefor is supplied either from the transmitters or the static condenser circuits above described. In this connection it is possible to provide a static condenser circuit for each receiver to be connected and disconnected from the system along with the receiver, in which case the system can be made to operate at unity power factor or any desired power factor and the signal voltage from the transmitters will remain constant except for resistance voltage drops even if the regulator transformers 41 and 51 and their associated condensers are eliminated from the system. This can be done by merely short circuiting the windings 39, 42, 49 and 52 of the regulating transformers 41 and 51. Again any phase unbalance in the indicating receivers can be corrected by resistors 199' of proper value inserted in the receiver leads.

*Operation of system of Figures 1a and 1b*

The system shown in 1a and 1b is intended to provide accurate follow-up operation of a controlled shaft 100 (Figure 1b) from a remote control shaft 80 (Figure 1a) even though the controlled shaft 100 is connected to moving devices of large mass requiring movement at high velocity. For example, the shaft 24 connected through a gear train to control shaft 80 may be the out-put shaft of a gun mount control computer and the shaft 89 connected through a gear train to controlled shaft 100 may drive a heavy gun mount for firing at rapidly moving targets. It is to be noted that the transmitters 20 and 21 are rigidly mechanically connected to the shaft 24 and the receivers 26 and 27 are rigidly mechanically connected to the shaft 89. Actual driving of the shaft 89 is accomplished through the prime mover 28 under control of voltages induced in secondary windings of the receivers 26 and 27 when there is an angle of disagreement between the transmitters 20 and 21 and receivers 26 and 27 respectively.

In driving gun mounts or other similar devices, there are three different types of loads which must be considered. One of these is substantially independent of velocity or acceleration, such as a load due to unbalance of the mount, windage thereon, etc. Such a load can not be compensated for in the follow-up system itself and in any system which has a degree of "looseness," as is true of all systems, this type of load will cause a lag or lead of the driven or control member behind the driving or control member. By eliminating such loads as far as possible and providing a prime mover of adequate power this lag or lead can be held to a minimum. A second type of load is the friction load which is substantially proportional to velocity of movement of the controlled member and will tend to cause a lag. Any lag due to this type of load can be substantially eliminated by velocity compensation in accordance with the present invention. A third type of load is inertia load due to rapid changes in velocity of the driven mass and may either cause a lag or lead depending upon whether the driven mass is being accelerated or decelerated. Any lag or lead due to this type of load can also be substantially eliminated by acceleration compensation in accordance with the present invention. Substantial elimination of lags or leads due to friction and inertia enables the controlled member to much more accurately follow the control member.

The friction load on the prime mover is substantially proportional to the speed of rotation of the controlled member. Increase in friction load as the velocity increases would normally cause a lag of the controlled member behind the control member. Under these conditions the magnetic drag on the disc 172 of the compensator 22 by reason of the magnet 173 causes the pivoted member 174 to advance in the direction of rotation of the gear 71 to rotate the rotor of the compensating transformer 23 to an angular position causing voltages to be induced in the stator windings 43 and 53 thereof in turn causing currents to flow in the quadrature axis of the primary windings 33 and 44 of the transmitters 20 and 21. These currents effectively rotate the fields in the transmitters to produce an effective lead of the transmitters. This lead is reflected by a rotation of the fields in the receivers 26 and 27 so that voltages are induced in the secondary windings of the receivers which cause whichever control relay 102 and 139 is in control to cause movement of the control solenoid plunger 134 in a direction to increase the speed or power of the prime mover 28. That is to say, the control plunger 134 moves a greater distance in the required direction when under control of the high speed relay 139 and remains in its out of center position for a longer period of time when under control of either receiver, than would be the case if no velocity compensation where employed. The greater the velocity, the greater this compensation so that increased power supplied to the prime mover 28 effectively compensates for increased friction load under high speed operating conditions.

If the velocity of the system is suddenly increased by increased speed of rotation of the control shaft 24, the inertia of the disc 172 also causes the pivoted member 174 to be carried around by the gear 71 so as to add to the velocity compensation effect just described. The effect is to supply more power to the prime mover 28 than would be the case if no acceleration compensation were introduced into the system. The controlled shaft, therefore, more closely follows the control shaft. If the speed of rotation of the system is suddenly decreased the inertia of the disc 172 causes the pivoted member to move in a direction opposite the direction of the rotation of the gear 71 so that a negative acceleration compensation is introduced into the system. This negative acceleration compensation subtracts from the velocity compensation above discussed so that less power is supplied to the prime mover 28 than would be the case if the negative acceleration were not introduced into the system. This also enables the controlled shaft 89 to more closely follow the control shaft 24.

It will be apparent that velocity compensation drops to zero when the velocity of the system is zero but that acceleration compensation may even be a maximum at zero velocity when the system is rapidly slowing down and reversing the direction of its rotation. The system is entirely stable when operating at uniform velocity or when accelerating. It has been found, however, that under conditions of deceleration the control tends to stop the controlled shaft at too rapid a rate this fact being largely due to the necessary employment of a centering spring in the control solenoid 126. This is also true of systems which do not have the velocity and acceleration compensation arrangement of the present invention although the acceleration compensation of the present system contributes to this result since it also tends to supply a stopping torque to the control shaft at a greater rate than would be the case if the acceleration compensation were eliminated. The centering spring 138 of the control solenoid 126 stores up potential energy under constant velocity or acceleration conditions of the system. This energy is quickly returned to the system whenever differences in the control voltages in the receivers 26 and 27 decrease, thus tending to decelerate the control shaft at too rapid a rate. In the system shown in Figure 1b the resistor 161 and contact member 162 functions as a stabilizing means to prevent the too rapid movement of the plunger 134 to its central position when the system starts to decelerate.

The resistor 161 is a voltage divider and has its central contact 162 connected to the volume control of the pump 163. When the load has been traveling at high speed the yoke 165 of the pump is positioned at an angle to its body so that the contact 162 is moved to a position near the end of the resistor 161. For example if the contact 162 is near the left end of resistor 161, the energization of winding 123 of the control solenoid 126 is increased over that of winding 124 since winding 124 is shunted to a greater extent than coil 123. This holds solenoid core 134 to the left, even though no angle of disagreement exists between the transmitter 21 and the receiver 27. This introduces velocity compensation at the receiver and may cause the system to become unstable. The saturable reactors 147 and 151 are, however, connected to oppose the action of the resistor 161. That is to say when the contact 162 is to the left, the winding 158 of reactor 147 carries more current than the winding 159 of reactor 151. This reduces the impedance in the circuit including relay winding 144 and increases the impedance in the circuit including relay winding 148. Even though the voltages in receiver winding 83 and 84 are substantially equal, the armature 143 of relay 139 tends to move upwardly because of greater energization of winding 144 than winding 148 so that this action tends to energize control solenoid winding 124 to a greater extent than solenoid winding 123 so as to tend to draw control solenoid plunger 134 to the right. Thus, if the velocity of the system should suddenly change, resistor 161 introduces velocity compensation but the reactors 147 and 151 introduce a counter change to partially balance action of resistor 161. This completely eliminates unstability. The action of the reactors 147 and 151 is, however, somewhat less than that of the resistors 161 so that resistor 161 always exercises some measure of control. The result is that when the load is being driven at high speed and the control voltage from the receiver 27 suddenly drops to zero, the solenoid plunger 134 is prevented from suddenly moving backward from its central position. Too rapid stopping of the controlled member is thus prevented. The saturable reactors are designed so that the retardation rheostat 161 can never over-control. That is to say, that the receiver 27 always exercises some control. If the load is operating at high velocity and the control shaft slows down, the controlled shaft may overhaul and pass the control shaft so that the angle of disagreement will be reversed. The retardation rheostat 161, however, prevents sudden reversal of the position of the solenoid plunger 134. The controlled member will, however, start to slow down and contact 162 of resistor 161 moves back toward its central position. The solenoid plunger 134 will be retarded in its return to its central position and during this time the load will be lagging the control shaft but this error is cancelled out by the velocity compensation introduced in the transmitter.

The control action of the low speed receiver 26 and differential relay 102 is much greater than that of either the high speed relay 139 or the retardation rheostat 161. This is true as both of the latter devices always leave substantial resistance shunting coils 123 and 124 of the control solenoid 126. The contacts 118, 119 and 121 of the low speed relay, however, substantially completely short circuit one or the other of the windings 123 or 124 except as this action is modified by the resistor 122. The extent of movement of the control solenoid plunger 134 and thus the maximum speed of the controlled member when under control of the low speed receiver can be predetermined by the value of resistor 122. The low speed relay control system is adjusted so that the low speed relay does not engage its contact 118 with either contact 119 or 121 until the low speed receiver 26 has a predetermined angle of disagreement with its transmitter. The high speed receiver must have an angle of somewhat less than 90° with its transmitter when the low speed receiver takes or relinquishes control. For example, in a system in which the high speed receiver travels at 36 times the speed of the low speed receiver, the high speed receiver can only be depended upon to bring the controlled shaft into synchronism with the control shaft within an angle somewhat less than 2½° on either side of zero angle of disagreement for the low speed receiver or 5° referred to the shaft of the ultimate controlled member. By adjusting the speed control system so that the low speed relay 102 closes or opens its contacts at an angle of approximately 2° on either side of zero angle of disagreement of the low speed receiver, the high speed receiver takes control only within this small total angle of 4° closest to zero angle of disagreement for the low speed receiver.

Receiving system of Figure 8

The receiving system of Figure 8 is similar in many respects to the receiving system of Figure 1b. The gear connections between the low speed and high speed receivers and the major portion of the hydraulic system has been omitted in Figure 8 to avoid duplication, as these elements may be the same as those shown in Figure 1b. When any of the elements shown in Figure 8 are the same as those shown in Figure 1b and perform the same function, they have been given the same reference numerals. Thus the system of Figure 8 includes a low speed power receiver 26 and a high speed power receiver 27. The phase wound windings 62 and 68 of the receivers 26 and 27 respectively are connected to transmitters such as the transmitters 20 and 21 respectively of Figure 1a. The coils 81 and 82 of the secondary winding of the low speed receiver 26 are connected to windings 101 and 106 respectively of a low speed control relay 102 through windings 103 and 107 respectively of saturable reactors 104 and 108 respectively in exactly the same manner as Figure 1b. The low speed receiver 26 and the low speed control relay operate in the same manner as the corresponding elements of Figure 1b. The high speed control relay 139 also has its windings 144 and 148 connected to the secondary windings 83 and 84 of the high speed receiver 27 through windings 146 and 149 respectively of reactors 147 and 151 respectively in the same manner as in Figure 1b.

Instead of employing a control solenoid 126 as in Figure 1b, the system of Figure 8 employs a direct current torque motor 217 controlled by the relays 102 and 139. This torque motor is provided with a rotor winding 218 comprising four coils 219, 220, 221 and 222 and a stator winding 223. The torque motor 217 may have an iron structure the same as that shown in Figure 4 and described with reference to the compensating transformer 23 of Figure 1a. The individual coils 219, 220, 221 and 222 of the rotor winding may be positioned in the slots 189 of the rotor iron of Figure 4 as shown by the dotted lines connecting these slots while the stator winding 223 may be positioned in the slots 186 of the stator iron in a manner similar to that shown by the dotted lines connecting the slots in Figure 4. The rotor winding 218 of the torque motor 217 may be energized in one axis from the direct current source 224 shown as comprising a bridge rectifier circuit 226 connected to the secondary winding 227 of a transformer 228 having a primary winding 229 connected to an alternating current source 231. The winding 218 of the torque motor 217 has a short circuit connection 232 in the quadrature axis. As explained with reference to the compensating transformer 23 of Figure 1a, the energization of the rotor winding 218 causes the rotor to seek a position of minimum reluctance such that the field through the rotor is aligned in the direction of the double arrow 193 of Figure 4 and in the absence of any energization of winding 223 the rotor returns to this position. When the relays 102 and 139 have their armatures 113 and 143 respectively in the central position, the winding 223 of the torque motor is not energized. This winding has one terminal connected to a center tap 233 on the secondary winding 227 of the transformer 228 and its other terminal connected to the central member 157 of the carbon piles 154 and 156 controlled by relay 139 and the central contact 118 actuated by relay 102. The upper and lower contacts 119 and 121 of relay 102 are connected across the direct current source 224 in parallel with the carbon piles 154 and 156 of the high speed relay 139 in series with saturating winding 136 and 137 respectively of reactors 108 and 104 respectively. It is apparent that the winding 223 has no voltage impressed there across when the central member 157 of the relay 139 is in its central position so that the carbon piles 154 and 156 have the same resistance and the contact 118 of relay 102 is out of engagement with contacts 119 and 121.

When the voltage induced in the windings 83 and 84 of high speed receiver 27 becomes unequal, the armature 143 of relay 139 moves from its center position to compress one of the carbon piles 154 and 156. This causes energization of the winding 223 of torque motor 217 in one direction or the other depending upon which carbon pile is compressed. The field produced in the iron of the torque motor 217 by energization of the winding 223 is at right angles to the field produced by the winding 218 so that the rotor tends to rotate in a direction to align the fields an amount which is substantially proportional to the energization of winding 223. Similarly differential energization of low speed relay 102 from its receiver 26 causes the armature 113 thereof to move contact 118 into engagement with either contact 119 or 121. Engagement with one of these contacts applies the full voltage of the direct current source 224 except for the drop in resistor 122 across the winding 223, the direction of the voltage thus applied depending upon which contact 119 or 121 is engaged by contact 118. Rotation of the rotor of torque motor 217 actuates the hydraulic control valve 167 which may be the same as the hydraulic control valve 167 shown in Figure 1b by means of a crank 236 and link 237. The effective control of low speed relay 102 is much greater than that of high speed relay 139 so that engagement of contact 118 with either contact 119 or 121 causes the low speed system to take control.

The saturating windings 137 and 136 of saturable reactors 104 and 108 respectively are connected in series with the contacts 121 and 119 respectively and operate in the same manner as the similar windings on the saturable reactors of Figure 1b. That is to say, current flow through winding 136 due to engagement between contacts 118 and 119 when the armature 113 of relay 102 is in its uppermost position, reduces the impedance of the circuit including coil 82 of the low speed receiver 26, windings 107 of the saturable reactor 108 and relay winding 106 so that the energization of winding 106 is increased to assist in returning armature 113 to its central position. The saturable reactors 147 and 151 associated with high speed relay 139 operate in substantially the same manner as the similar reactors discussed with reference to Figure 1b. The saturating windings 238 and 239 thereof, however, are energized in somewhat different manner. Both windings 238 and 239 are connected across the terminals of the winding 223 of the torque motor 217 in series with unidirectional conducting devices 241 and 242 respectively. When the winding 223 is energized in one direction the current flows through saturable winding 238 on reactor 147 and when winding 223 is energized in the opposite direction the current flows through winding 239 on reactor 151. The connections are such that the saturable reactors 147 and 151 reduce the impedance in the winding 144 or 148 which has the lesser voltage impressed thereacross from the windings 83 and 84 of the high speed receiver 27. Since the rotor of torque motor 217 is not returned by spring tension but returns to neutral position by magnetic attraction at a controlled rate set by the inertia of the rotor as well as the rate of decrease of energization of the winding 223, no retardation rheostat 161, such as shown in Figure 1b, is required to prevent too sudden stopping of the system of Figure 8.

The operation of the system of Figure 8 is substantially the same as that of Figure 1b except that a torque motor has been substituted for the control solenoid of Figure 1b, and retardation resistor 161 of Figure 1b has been omitted, and the saturating winding of the saturable reactors 147 and 151 have their saturating winding energized under control of relay 139 and have unidirectional current devices in series therewith in order to enable their proper energization to assist in returning armature 143 of relay 139 to its central position. As explained with reference to Figure 1b the action of the low speed relay 102 overcomes any action of high speed relay 139 to take control whenever contact 118 engages contact 119 or 121. The system is adjusted so that the low speed relay 102 takes control at a predetermined maximum angle of disagreement, for example, 2° of the low speed receiver on either side of zero angle of disagreement thereof in a system in which the high speed receiver and transmitter rotates at 36 times the speed of the low speed receiver and transmitter.

Figure 9:
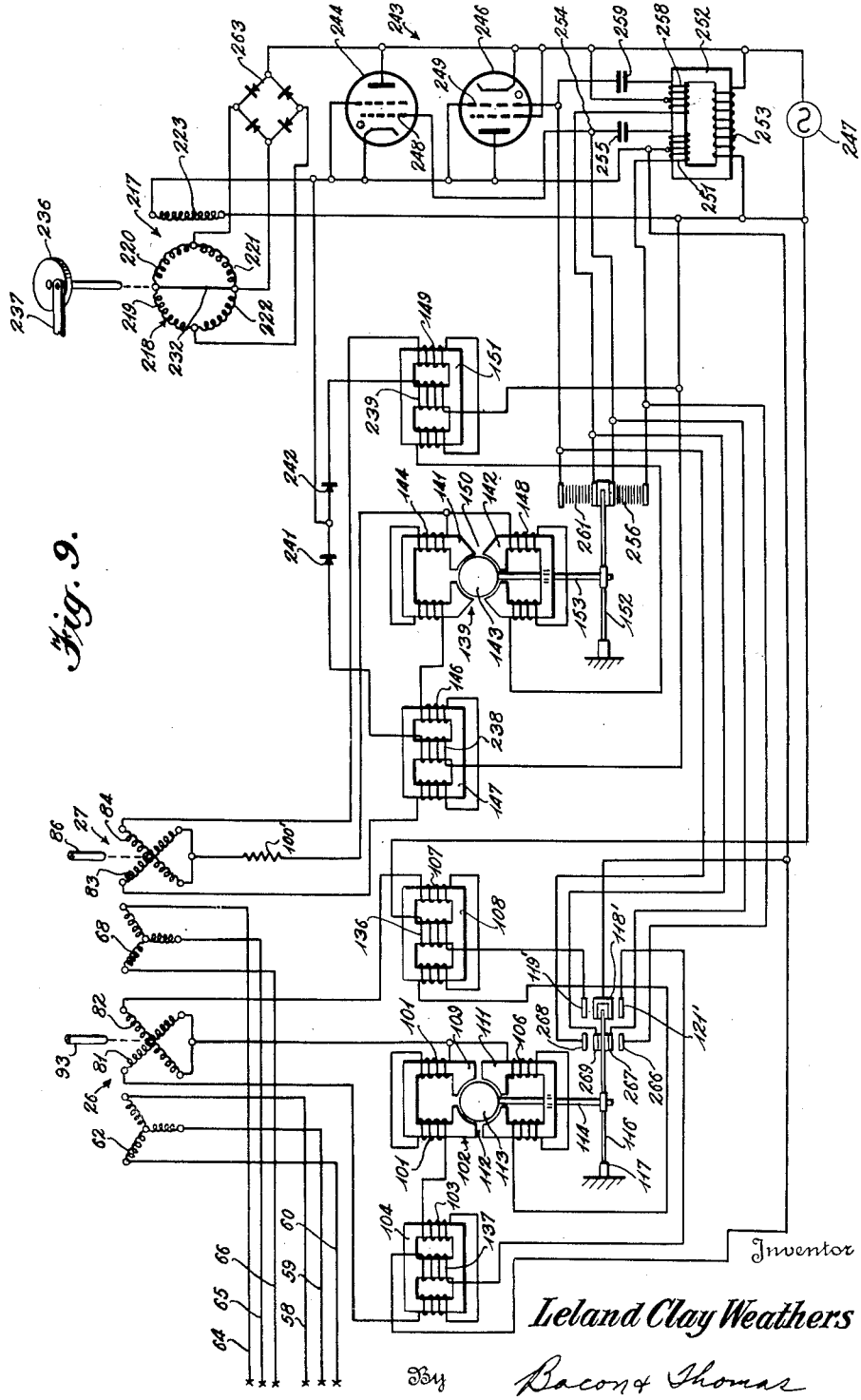
Figure 9 is a view similar to 1b showing a further modification of the receiving portion of the system.

*Receiving system of Figure 9*

The receiving system of Figure 9 is essentially similar to the receiving system of Figure 8 in that the torque motor 217 is employed to actuate the control valve of the hydraulic system. It differs from the system of Figure 8 in that an amplifying system 243 is employed to increase the power delivered to the control winding 223 of the torque motor 217. This amplifying system includes a pair of gas filled grid controlled tubes 244 and 246 connected for half way rectification in opposite directions under control of phase shifting circuits for controlling current flow through the tubes. The tubes 244 and 246 are each connected in a series circuit with the winding 223 across a source 247 of alternating current. The control grids 248 and 249 of the tubes 244 and 246 respectively are normally supplied with alternating current voltage 180° out of phase with the respective anode voltages of the tubes so that no current flows through either of the tubes under such normal conditions. With respect to the tube 244, this is accomplished by a center tapped secondary winding 251 on a transformer 252 having its primary 253 across the source 247. The control grid 248 is connected to the common terminal 254 between a condenser 255 and a carbon pile resistor 256 forming a series circuit across the end terminals of the transformer secondary winding 251, the center tap of this winding being connected to the cathode of the tube 244. When the resistance of carbon pile 256 is large compared to the capacitive reactance of condenser 255 the voltage impressed on the grid 248 of the tube 244 is substantially 180° out of phase with the anode voltage thereof. When the resistance of the carbon pile 256 is lowered the phase of the grid voltage shifts toward an in phase relation with the anode voltage so that the tube 244 becomes conductive, the conductivity of the type depending upon the degree of phase shift. A similar circuit involving center tapped secondary winding 258 on the transformer 252, condenser 259 and carbon pile 261 is provided for phase shifting of the voltage applied to the control grid 249 of tube 246.

The carbon piles 256 and 261 are associated with the spring member 152 of the high speed relay 139 so that movement of the armature 143 thereof away from a central position compresses one or the other of carbon piles 256 or 261 to reduce its resistance and thus render conducting one of the tubes 244 or 246 respectively. This action energizes winding 223 of torque motor 217 in one direction or the other depending upon which tube 244 or 246 is rendered conductive. The primary winding 218 of torque motor 217 is energized with direct current by means of a bridge rectifier 263 connected across the source 247 and the torque motor operates in exactly the same manner as torque motor 217 of Figure 8 except amplified power is supplied thereto from the control system.

The operating windings 101 and 106 of the low speed relay 102 of Figure 9 are connected in exactly the same manner as the similar windings relay 102 of Figure 8. Contacts 266 and 267 of low speed relay 102 are connected in parallel with carbon pile 256 of high speed relay 139 and contacts 268 and 269 of low speed relay 102 are connected in parallel with carbon pile 261 of high speed relay 139. It will be apparent that engagement of contact 267 with contact 266 will shift the grid voltage of tube 244 completely into phase with the anode voltage thereof to render this tube completely conductive and similarly engagements of contacts 268 and 269 of low speed relay 102 will shift the grid voltage of tube 246 into phase with the anode voltage to render this tube completely conductive. Again, the low speed relay 102 takes control at a predetermined angle of disagreement of the low speed receiver with the low speed transmitter as the carbon piles 261 and 256 associated with the high speed receiver always have substantial resistance even when the armature 143 of the high speed relay is in its maximum displaced position.

Since the control contacts 266 to 269 inclusive associated with low speed relay 102 are connected with an alternating voltage, phase shifting circuit these contacts are maintained separate from contacts 118', 119' and 121' which control the energization of the saturating windings 137 and 136 of the saturable reactors 104 and 108 respectively. So far as the control of the saturable reactors 104 and 108 are concerned, the contacts 118', 119' and 121' operate exactly similar to the contacts 118, 119 and 121 respectively of Figure 8. Except as described above all of the elements of Figure 9 are similar and operate in the same manner as corresponding elements of Figure 8 and have been given the same reference numerals.

System of Figures 10a and 10b

Instead of applying velocity and acceleration to the transmitting end of the system, as in the previously described embodiments of the invention, this compensation can be applied at the receiving end of the system as shown in Figures 10a and 10b. In such a system the compensating device along with the compensating transformer 23 shown in Figure 1a is omitted from the system as shown in Figure 10a. Otherwise, the elements shown in Figure 10a are exactly similar and function in the same manner as corresponding elements in Figure 1a and have been given the same reference characters. It will be noted that the series circuit including winding 42 on regulating transformer 41 omits the compensating transformer winding 43 of Figure 1a and the circuit including the winding 52 on regulating transformer 51 omits the winding 53 of the compensating transformer 23.

The receiving circuit of Figure 10b also includes the low speed receiver 26 and high speed receiver 27 which have their various windings connected to the transmitters of the transmitting circuit and to the low speed and high speed relays 102 and 139 in exactly the same manner as described with reference to Figures 1a and 1b. The shaft 97 carrying the gears 96 and 98 which form part of the driving connection between the receivers 26 and 27, however, carries an additional gear 271 which drives a velocity and acceleration compensation device indicated generally at 272. This device includes a pivoted member 273 carried by a shaft 274 which is concentric with the shaft 97 and which enables the pivoted member 273 to rotate the shaft 274 in either direction from a neutral position shown in Figure 10b and Figure 11. The shaft 274 is returned to its neutral position by centering springs 276 and 277 shown in Figure 11. The pivoted member 273 has shafts 278 and 279 journaled in its opposite ends, these shafts carrying gears 281 and 282 respectively meshing with gear 271. The shafts 278 and 279 also carry electrical conducting discs 283 and 284, respectively, passing between the poles of magnets 286 and 287 respectively, carried by the pivoted member 273. The compensating device 272 operates in a manner very similar to the compensating device 22 of Figure 1a. That is to say, the drag on the discs 283 and 284 caused by magnets 286 and 287 cause the pivoted member 273 to be carried by the gear 271 in the direction of its rotation through an angle which is substantially directly proportional to the speed of rotation of the discs 283 and 284. Also the discs 283 and 284 have considerable moment of inertia so that an increase in velocity of the gear 271 causes the pivoted member 273 to be carried further in the direction of rotation of the gear 271 whereas a decrease in velocity causes the pivoted member 273 to be carried in a direction opposite to the direction of rotation of the gear 271.

Velocity and acceleration compensation is applied to the receiving system of Figure 10b through variable resistance shown as comprising carbon piles 288 and 289 connected in parallel with the carbon piles 154 and 156 associated with the high speed relay 139 and also in parallel with the contacts 119, 119 and 121 of the low speed relay 102. The carbon piles 154 and 156 differentially excite the control solenoid windings 123 and 124 of a control solenoid which may be exactly similar to the control solenoid 126 of Figure 1b. Direct current for energizing the control solenoid windings 123 and 124 is derived from a direct current source 293 including a bridge rectifier circuit 294, a transformer 296 and an alternating current source 297. The carbon piles 288 and 289 of the compensator 272 also apply differential excitation to the coils 123, 124, which differential excitation adds to or subtracts from the carbon piles 154 and 156 depending upon the velocity and acceleration conditions of the system. That is to say, a velocity in a given direction in the rotation of the system or increase in velocity increases the energization of the coil 123 or 124 which already has the greatest excitation from the carbon piles 154 and 156. A decrease in velocity has the opposite effect. This applies greater power to the prime mover 28 of Figure 1b under high velocity or acceleration conditions and less power under conditions of deceleration as explained with reference to Figures 1a and 1b.

The system thus far described with reference to Figures 10a and 10b may exhibit instability or tend to hunt and to correct this tendency, an anti-hunt generator 298, which may be driven by the shaft 89, may be provided to supply direct current energization for the various saturating windings of the saturable reactors 147 and 151. This anti-hunt generator may be a small direct current generator having an armature winding 299 and a field winding 300, the field winding being energized from the direct current source 293. The direct current voltage of winding 299 will be substantially proportional to the angular velocity of shaft 89 and will reverse in polarity upon reversing shaft 89. This voltage is supplied to the saturating winding of saturable reactors 151 and 108 or 147 and 104 depending upon the polarity thereof, a pair of unidirectional conducted devices 302 and 303 being employed for this purpose. Thus, a voltage having polarity in one direction from armature 299 enables current flow from brush 304 of the generator winding 299 through unidirectional conducting device 302, winding 158 of reactor 147 and winding 137 of reactor 104 back to brush 306 of armature winding 299. Polarity in the opposite direction allows current flow from brush 306 of generator 298 through unidirectional conducting device 303, winding 159 of reactor 151 and winding 136 of reactor 108 back to brush 304 of generator 298. In all cases the connection is such that the anti-hunt generator 298 operates in opposition to the velocity compensation of device 272 by varying the impedance of the circuits of the windings on the relays 102 and 139. The effect of the anti-hunt generator 298 is, however, less than that of the velocity compensating device 272 so that the velocity compensating device 272 does supply effective velocity compensation. However, the employment of the anti-hunt generator 298 has been found to substantially eliminate any tendency for the system to oscillate or hunt.

The operation in Figures 10a and 10b should be apparent from the description thereof. The velocity compensation device 272 increases the power delivered by the prime mover 28 shown in Figure 1b under conditions of high velocity in either direction in order to stiffen the system and cause the controlled member to more closely follow the control member even though the high velocity introduces additional friction load. Also, the compensation device 272 increases the power delivered by the prime mover under conditions of positive acceleration and decreases this power under conditions of negative acceleration to again stiffen the system against lags or overshooting caused by high inertia loads. The hydraulic system employed can be the same as that shown in Figure 1b and has been omitted to avoid duplication in 10b. The anti-hunt generator 298 acts as a stabilizing means to effectively prevent hunting of the system when velocity and acceleration compensation is applied in the receiving end of the system and no retardation resistor 161, such as shown in Figure 1b, is necessary in the system of Figure 10b.

The system of Figures 10a and 10b is particularly useful where the loads on different receivers connected to the same transmitter are of different characteristics so that velocity and acceleration compensation is required for each individual set of receivers. In such cases a compensator such as shown at 272 is employed with each set of receivers. On the other hand, the system of Figures 1a and 1b and the various receiving systems, also discussed with reference to Figures 8 and 9, are particularly useful where a plurality of such receivers are connected to the same transmitters to control loads having substantially the same characteristics. Under these conditions a single compensating device can be employed in the transmitting end of the system to compensate for all of the loads.

Figures 5 to 7 show a modified form of resistance control element 308 shown as being connected to a high speed control relay 139. The resistance element 308 has a roller contact 309 and such a resistance element can be substituted for the carbon piles employed with the high speed relays of Figures 1b, 8 and 10b as well as for the carbon piles 288 and 289 of Figure 11. In order that relatively wide changes in resistance can be effected by small movement of the spring element 152 the resistance element 308 may be wound on an insulating member 311 positioned at an angle to the axis of rotation of the contact roller 309 as shown most clearly in Figure 7. It will be apparent that if the angle between the member 311 and the axis 309 is made relatively small, large changes in resistance can be produced by relatively small movement of the roller 309.

While I have described the preferred embodiments of my invention, it is to be understood that the details thereof may be varied within the scope of the following claims.

I claim:

1. A self-synchronous system for maintaining a controlled device in substantial synchronism with a control device, said controlled device providing a friction load increasing with the speed of said controlled device and an acceleration load varying with changes in speed of said controlled device, said system comprising, a self-synchronous transmitter having relatively rotatable members and means for producing an alternating field in said members, one of said members being driven by said control device, a variable speed power means for driving said controlled device, a self-synchronous receiver electrically connected to said transmitter and driven by said power means, means responsive to voltages resulting from an angle of disagreement between said receiver and said transmitter for controlling said power means to cause said controlled device to follow said control device, and compensator means, said compensator means including means responsive to the speed of said control device for rotating said magnetic field in said transmitter relative to said members to produce an effective increase in said angle of disagreement to increase the power delivered by said power means to said controlled device in an amount substantially compensating for the increase of said friction load as the speed of said devices increases, and means responsive to changes in speed of said control device for effectively varying said angle of disagreement to vary the power delivered by said power means to compensate for variations in said inertia load.

2. A self-synchronous system for maintaining a controlled device in substantial synchronism with a control device, said control device providing an inertia load varying with changes in speed of said controlled device, said system comprising, a self-synchronous transmitter having relatively rotatable members and means for producing an alternating field in said members, one of said members being driven by said control device, a variable speed power means for driving said controlled device, a self-synchronous receiver electrically connected to said transmitter and driven by said power means, means responsive to voltages resulting from an angle of disagreement between said receiver and said transmitter for controlling said power means to cause said controlled device to follow said control device, and compensator means, said compensator means including means responsive to changes in speed of said control device for rotating said magnetic field in said transmitter relative to said members to produce an effective variation in said angle of disagreement to vary the power delivered by said power means to compensate for variations in said inertia load.

3. A self-synchronous system for maintaining a controlled device in substantial synchronism with a control device, said controlled device providing a friction load increasing with the speed of said controlled device and an inertia load varying with changes in speed of said controlled device, said system comprising, a self-synchronous transmitter driven from said control device, a variable speed power means for driving said controlled device, a self-synchronous receiver electrically connected to said transmitter, means actuated by said receiver for supplying control voltages, control means responsive to said control voltages for controlling said power means to cause said controlled device to follow said control device, and compensator means, said compensator means including means responsive to the speed of one of said devices for varying the control voltages supplied to said control means to compensate for the increase of said friction load as the speed of said devices increases and means responsive to changes in speed of one of said devices for additionally varying the control voltages supplied to said control means to compensate for variations in said inertia load, said control means including a magnetically actuated armature movable from a central position for controlling said power means and resilient means for returning said armature to central position, and stabilizing means responsive to the speed of said power means for preventing too rapid return of said armature to central position when the speed of said control device rapidly decreases.

4. A self-synchronous system for maintaining a controlled device in substantial synchronism with a control device, said controlled device providing a friction load increasing with the speed of said controlled device and an inertia load varying with changes in speed of said controlled device, said system comprising, a self-synchronous transmitter driven from said control device, a variable speed power means for driving said controlled device, a self-synchronous receiver electrically connected to said transmitter, means actuated by said receiver for supplying control voltages, control means responsive to said control voltages for controlling said power means to cause said controlled device to follow said control device, and compensator means, said compensator means including means responsive to the speed of one of said devices for varying the control voltages supplied to said control means to compensate for the increase of said friction load as the speed of said devices increases and means responsive to changes in speed of one of said devices for additionally varying the control voltages supplied to said control means to compensate for variations in said inertia load, said control means including a torque motor movable from a central position in response to said control voltages for controlling said power means, said torque motor having a minimum reluctance position at said central position causing return of said motor to said central position at a sufficiently low rate to prevent too rapid stopping of said controlled device when the speed of said control device decreases.

5. In a self-synchronous system for maintaining a controlled device in substantial synchronism with a control device, said controlled device providing a friction load increasing with the speed of said controlled device and an inertia load varying with changes in speed of said controlled device, said system comprising, a self-synchronous transmitter driven from said control device, means for producing an alternating magnetic field in said transmitter, a variable speed power means for driving said controlled device, a self-synchronous receiver electrically connected to said transmitter for controlling said power means to cause said controlled device to follow said control device, compensator means driven by said control device, said compensator means including means responsive to the speed of said control device for producing a second single phase magnetic field in said transmitter at an angle to said first field for rotating the field in said transmitter to substantially compensate for the increase in said friction load as the speed of said device increases, and means responsive to changes in the speed of said device for varying said second field to substantially compensate for variations in said inertia load.

6. In a self-synchronous system for maintaining a controlled device in substantial synchronism with a control device, said controlled device providing a friction load increasing with the speed of said controlled device and an inertia load varying with changes in speed of said controlled device, said system comprising, a self-synchronous transmitter driven from said control device, means for producing an alternating magnetic field in said transmitter, a variable speed power means for driving said controlled device, a self-synchronous receiver electrically connected to said transmitter for controlling said power means to cause said controlled device to follow said control device, compensator means driven by said control device, said compensator means including a transformer having a stator member and a rotor member, means on one of said members for producing a single phase field in said transformer, said rotor having a minimum reluctance position for said field, secondary windings on the other of said members positioned to have voltages induced therein by said field having a value substantially proportional to the angle of displacement of said rotor from said position, and means responsive to the speed of said control device and to change in speed thereof for displacing said rotor, said secondary windings being connected to said transmitter to cause said voltages to rotate the field therein to substantially compensate for the increase of said friction load as the speed of said device increases and to compensate for variations in said inertia load.

7. In a self-synchronous system for maintaining a controlled device in substantial synchronism with a control device, said controlled device providing a friction load increasing with the speed of said controlled device and an inertia load varying with changes in speed of said controlled device, said system comprising a self-synchronous transmitter driven from said control device, means for producing an alternating magnetic field in said transmitter, a variable speed power means for driving said controlled device, a self-synchronous receiver electrically connected to said transmitter for controlling said power means to cause said controlled device to follow said control device, compensator means driven by said control device, said compensator means having a pivoted member and a disc of electrically conducting material journaled for rotation thereon, means for driving said disc from said controlled means through a member concentric with the pivotal axis of said pivoted member, means for producing a magnetic field threading said disc whereby said pivoted member is subjected to a torque substantially proportional to the speed of said control device, said disc having a substantial moment of inertia whereby said pivoted member is subject to a torque substantially proportional to the acceleration of said control device, and means rotated by said pivoted member for rotating the field in said transmitter to substantially compensate for changes in said friction load as the speed of said device changes and to substantially compensate for variations in said inertia load.

8. In a self-synchronous system for maintaining a controlled device in substantial synchronism with a control device, said controlled device providing a friction load increasing with the speed of said controlled device and an inertia load varying with changes in speed of said controlled device, said system comprising, a self-synchronous transmitter driven from one of said devices, a variable speed power means for driving said controlled device, a self-synchronous receiver electrically connected to said transmitter, means actuated by said receiver to provide control voltages for controlling said power means to cause said controlled device to follow said control device, compensator means driven by said control device, said compensator means having a pivoted member and a disc of electrically conducting material journaled for rotation thereon, means for driving said disc from said controlled means through a member concentric with the pivotal axis of said pivoted member, means for producing a magnetic field threading said disc whereby said pivoted member is subjected to a torque substantially proportional to the speed of said control device, said disc having a substantial moment of inertia whereby said pivoted member is subject to a torque substantially proportional to the acceleration of said control device, and means rotated by said pivoted member for varying said control voltages to substantially compensate for changes in said friction load as the speed of said device changes and to substantially compensate for variations in said inertia load.

9. A self-synchronous system for maintaining a controlled device in substantial synchronism with a control device, said controlled device providing a friction load increasing with the speed of said controlled device and an inertia load varying with changes in speed of said controlled device, said system comprising, a self-synchronous transmitter driven from said control device, a variable speed power means for driving said controlled device, a self-synchronous receiver driven by said power means and electrically connected to said transmitter for controlling said power means to cause said controlled device to follow said control device, compensator means driven by one of said devices, said compensator means including a pivoted member and a disc of electrically conducting material mounted for rotation on said pivoted member, means for driving said disc from said controlled device by a member concentric with the pivotal axis of said pivoted member, means for producing a magnetic field through said disc whereby said pivoted member is subjected to a torque proportional to the speed of said controlled device, said disc having a substantial moment of inertia whereby said pivoted member is subjected to a torque proportional to the acceleration of said controlled device, means actuated by said receiver for supplying control voltages, control means responsive to said control voltages for controlling said power means, and means actuated by said pivoted member for varying said control voltages to substantially compensate for the increase of said friction load as the speed of said controlled device increases and to substantially compensate for variations in said inertia load.

10. A self-synchronous system for maintaining a controlled device in substantial synchronism with a control device, said controlled device providing a friction load increasing with the speed of said controlled device and an inertia load varying with changes in speed of said controlled device, said system comprising, a self-synchronous transmitter driven from said control device, a variable speed power means for driving said controlled device, a self-synchronous receiver driven by said power means and electrically connected to said transmitter for controlling said power means to cause said controlled device to follow said control device, compensator means driven by one of said devices, said compensator means including a pivoted member and a disc of electrically conducting material mounted for rotation on said pivoted member, means for driving said disc from said controlled device by a member concentric with the pivotal axis of said pivoted member, means for producing a magnetic field through said disc whereby said pivoted member is subjected to a torque proportional to the speed of said controlled device, said disc having a substantial moment of inertia whereby said pivoted member is subjected to a torque proportional to the acceleration of said controlled device, means actuated by said receiver for supplying control voltages, control means responsive to said control voltages for controlling said power means, and means actuated by said pivoted member for varying said control voltages to substantially compensate for the increase of said friction load as the speed of said controlled device increases and to substantially compensate for variations in said inertia load, said control means including a magnetically actuated member having a central position and a spring for returning said actuated member to central position, a generator driven by said controlled device for supplying voltages modifying said control voltages for preventing too rapid return of said actuated device to its central position when the speed of said controlled device rapidly decreases.

11. A velocity and acceleration compensating system for a self-synchronous system which extends between a control device and a controlled device, said controlled device providing a friction load varying with speed and an inertia load varying with acceleration of said controlled device, said compensating system including a mechanical differential having differential gearing and provided with a rotatable input member, a rotatable intermediate member and a rotatable output member, means rotating said input member at a speed substantially proportional to the speed of said control device, a disc rotated by said intermediate member, means for applying a magnetic drag to said disc whereby said output member is subjected to a torque substantially proportional to the speed of said controlled device, said disc having a substantial moment of inertia whereby said output member is subjected to a torque substantially proportional to the acceleration of said controlled device, and means actuated by rotation of said output member due to said torques for substantially compensating for the variations in said friction and inertia loads, said last named means including a compensating transformer having a stator element and a rotor element connected to said output member for rotation thereby, said transformer having an energizing winding on one of said elements and a secondary winding on the other of said elements positioned to have voltages induced therein substantially proportional to the angular displacement of said rotor from a predetermined position, said rotor having minimum reluctance at said predetermined position causing return of said rotor to said position when said torques drop to zero, said secondary winding being connected to the transmitter of said self-synchronous system for introducing compensating voltages into said system.

12. In a self-synchronous system, a self-synchronous transmitter having a rotor member and a stator member, primary windings upon one of said members, a power source for energizing said primary winding to produce a field in said members, a phase wound secondary winding upon the other of said members, a self-synchronous receiver, conductors connecting said receiver to said secondary windings to receive excitation from said transmitter whereby said receiver provides an inductive load on said transmitter, capacitive reactances connected across said conductors to take a leading current from said transmitter, a transformer having a winding connected in series between said source and said primary windings, said transformer having another winding connected across a capacitive reactance whereby the voltages supplied by said secondary windings remain substantially constant as additional receivers are connected to or disconnected from said transmitter.

13. In a self-synchronous system, a self-synchronous transmitter having a rotor member and a stator member, primary windings upon one of said members having pairs of oppositely disposed taps in quadrature relation to each other, a power source connected to one pair of taps for energizing said primary windings to produce a field in said members, phase wound secondary windings upon the other of said members, a self-synchronous receiver, conductors connecting said receiver to said secondary windings to receive excitation from said transmitter, whereby said receiver provides an inductive load on said transmitter, capacitive reactances connected across said conductors to provide a capacitive load on said transmitter, a transformer having a core provided with three legs, a winding on an outer leg of said core connected in series between said source and said primary windings to provide an exciting circuit for said transmitter, a quadrature circuit connected across the other pair of taps, said circuit being connected in series with another winding on said transformer positioned on the other outer leg thereof to provide equal impedances in said exciting and quadrature circuits, said transformer having a tertiary winding connected across a capacitive reactance and positioned upon the central leg of said core whereby the voltages supplied by said secondary windings remain substantially constant as additional receivers are connected to or disconnected from said transmitter.

14. In a self-synchronous system, a self-synchronous transmitter having a rotor member and a stator member, primary windings upon one of said members having pairs of oppositely disposed taps in quadrature relation to each other, a power source connected to one pair of taps for energizing said primary windings to produce a field in said members, phase wound secondary windings upon the other of said secondary windings, a self-synchronous receiver, conductors connecting said receiver to said secondary windings to receive its excitation from said secondary windings, whereby said receiver provides an inductive load on said transmitter, capacitive reactances connected across said conductors to provide a capacitive load on said transmitter, a transformer having a core provided with three legs, a winding on an outer leg of said core connected in series between said source and said primary windings to provide an exciting circuit for said transmitter, a quadrature circuit connected across the other pair of taps, said circuit being connected in series with another winding on said transformer positioned on the other outer leg thereof to provide substantially equal impedances in said exciting and quadrature circuits, said transformer having a tertiary winding connected across a capacitive reactance and positioned upon the central leg of said core whereby the voltages supplied by said secondary windings remain substantially constant as additional receivers are connected to or disconnected from said transmitter, a compensating transformer having a winding in series with said quadrature circuit and means for producing voltages in said winding of said compensating transformer varying substantially with the speed and acceleration of said transmitter for rotating the field in said transmitter to compensate for friction and inertia loads controlled by said receiver.

15. In a self-synchronous system, a self-synchronous transmitter having a rotor member and a stator member, primary windings upon one of said members, a power source for energizing said primary windings to produce a field in said members, phase wound secondary windings upon the other of said members, a self-synchronous receiver, conductors connecting said self-synchronous receiver to said secondary windings, a resistor connected in series with at least one of said conductors, said resistor having a value correcting for phase unbalance in said system.

16. A self-synchronous system comprising a low speed transmitter driven by a control device, a high speed transmitter driven by said control device at a greater rate of speed than said low speed transmitter, power means for driving a controlled device, a low speed receiver driven by said power means and having output windings, a high speed receiver driven by said power means and having output windings, a control means responsive to voltages developed in the output windings of said high speed receiver by an angle of disagreement between said high speed transmitter and receiver for controlling said power means to cause said controlled device to follow said control device for small angles of disagreement between said low speed transmitter and receiver, a second control means responsive to voltages developed in the output windings of said low speed receiver by an angle of disagreement between said low speed transmitter and receiver for controlling said power means for large angles of disagreement of said low speed transmitter and receiver, a control circuit for said power means including a continuously variable impedance forming part of said first control means, and contacts forming a part of said second control means for short-circuiting said impedance when the angle of disagreement between the said low speed transmitter and receiver exceeds a predetermined amount.

LELAND CLAY WEATHERS.

REFERENCES CITED

The following references are of record in the file of this patent:

UNITED STATES PATENTS

| Number | Name | Date |
|---|---|---|
| 1,693,314 | Murphy | Nov. 27, 1928 |
| 2,056,348 | Edwards | Oct. 6, 1936 |
| 2,176,102 | Riggs | Oct. 17, 1939 |
| 2,343,945 | Weathers | Mar. 14, 1944 |
| 2,403,605 | Lesnick | July 9, 1946 |

FOREIGN PATENTS

| Number | Country | Date |
|---|---|---|
| 489,271 | Great Britain | July 22, 1938 |